United States Patent
Wei et al.

(10) Patent No.: US 7,368,867 B2
(45) Date of Patent: May 6, 2008

(54) FIELD EMISSION DEVICE WITH CATHODE WIRES AND CARBON NANOTUBES

(75) Inventors: Yang Wei, Beijing (CN); Liang Liu, Beijing (CN); Shou-Shan Fan, Beijing (CN)

(73) Assignees: Tsinghua University, Bejing (CN); Hon Hai Precision Industry Co., Ltd, Tucheng, Taipei Hsien (TW)

( * ) Notice: Subject to any disclaimer, the term of this patent is extended or adjusted under 35 U.S.C. 154(b) by 96 days.

(21) Appl. No.: 11/265,359

(22) Filed: Nov. 1, 2005

(65) Prior Publication Data

US 2008/0007154 A1    Jan. 10, 2008

(30) Foreign Application Priority Data

Nov. 5, 2004    (CN) .................. 2004 1 0052163

(51) Int. Cl.
*H01J 63/04*    (2006.01)
*H01J 1/02*    (2006.01)

(52) U.S. Cl. .................. 313/497; 313/351; 313/495
(58) Field of Classification Search ........ 313/495–497, 313/169.1, 169.4, 306, 309–310, 351, 355, 313/311, 336
See application file for complete search history.

(56) References Cited

U.S. PATENT DOCUMENTS

| | | | |
|---|---|---|---|
| 5,764,004 A * | 6/1998 | Rabinowitz | 315/169.1 |
| 6,020,677 A * | 2/2000 | Blanchet-Fincher et al. | 313/336 |
| 6,404,113 B1 * | 6/2002 | Okamoto | 313/309 |
| 6,642,639 B2 | 11/2003 | Choi et al. | |
| 6,825,610 B2 * | 11/2004 | Imai et al. | 313/495 |
| 7,132,784 B2 * | 11/2006 | Mohri et al. | 313/484 |
| 2001/0034174 A1 * | 10/2001 | Moore | 445/24 |
| 2004/0027054 A1 * | 2/2004 | Uda et al. | 313/495 |
| 2005/0179363 A1 * | 8/2005 | Choi et al. | 313/497 |
| 2006/0022574 A1 * | 2/2006 | Chen et al. | 313/495 |
| 2006/0066214 A1 * | 3/2006 | Chen et al. | 313/495 |

* cited by examiner

*Primary Examiner*—Mariceli Santiago
*Assistant Examiner*—Anne M Hines
(74) *Attorney, Agent, or Firm*—Morris Manning Martin LLP; Tim Tingkang Xia, Esq.

(57) ABSTRACT

A carbon nanotube (CNT) electron emitter source is provided according to the present invention. The CNT electron emitter source includes a dielectric glass substrate (101), a plurality of cathode connectors (102), a plurality of metal wires (103), a plurality of CNT electron emitters (104) provided on surfaces of the metal wires, and a plurality of dielectric barriers (105). The cathode connectors are distributed along two opposite sides of the dielectric glass substrate. Each of the metal wires has two terminals secured on a pair of corresponding opposite cathode connectors. Each of the metal wires has a substantially protrusive surface, and at least some of the electron emitters discretely extend from the protrusive surface into a space surrounding the metal wire. The dielectric barriers are distributed on the dielectric glass substrate alternately between the metal wires.

11 Claims, 4 Drawing Sheets

FIELD EMISSION DEVICE WITH CATHODE WIRES AND CARBON NANOTUBES

BACKGROUND OF THE INVENTION

1. Field of the Invention

The present invention relates to a field emission device, and more particularly to a field emission device having a carbon nanotube (CNT) electron emitter source.

2. Prior Art

CNTs were originally produced as by-products of fullerene synthesis. CNTs have remarkable mechanical, electronic, and magnetic properties, which can be varied in principle by varying diameters and chiralities of the CNTs and the number of concentric shells that constitute each CNT. CNTs with extremely small diameters, hollow centers, chemical inertness, and mechanical strength have been used in a vast range of nanotube applications, such as electron field emitters, room-temperature transistors, and vehicles for hydrogen storage. In particular, there has been much effort to develop field emission displays (FEDs) using CNTs. CNT-FEDs have great potential for being applied to emissive devices including flat panel displays, cathode-ray tubes, backlights for liquid crystal displays, outdoor displays, and traffic signals.

Field emission is usually defined as "the emission of electrons from the surface of a condensed phase into another phase, frequently a vacuum, under the action of a high electrostatic field." Since no thermal energy is necessary, field emission is called a "cold emission" process. A conventional FED depends on field emission from an array of small micro tips. A high electric field is applied between a gate electrode and tip emitters, whereby field emission of electrons from the tip emitters is induced. The ejected electrons strike a phosphor-coated screen, whereby visible light is emitted.

CNTs are generally considered to be the best field emitters, due to the very high electrical conductivity and extremely small tip area of each CNT. U.S. Pat. No. 6,642,639, granted to Won-bong Choi etc. on Nov. 4, 2003, discloses a field emission array adopting CNTs as an electron emitter source. Referring to FIG. 1, the field emission array includes a rear substrate assembly 100 and a front substrate assembly 200. In the rear substrate assembly 100, a plurality of cathodes 11 are formed as stripes over a rear substrate 10, and CNTs 11' are deposited on the cathodes 11. The front substrate assembly 200 includes a combination of a front substrate 20 and a nonconductive plate 23. A plurality of anodes 21 are formed as stripes over the front substrate 20, and a phosphor layer 22 is deposited on each of the anodes 21. The nonconductive plate 23 has a plurality of gates 24 formed as stripes thereon, and this subassembly is combined with the front substrate 20 by spacers 25.

As shown in FIG. 1, the CNTs 11' are densely arranged on the cathodes 11. Electrons can be emitted continuously at a high density from the CNTs 11'. However, tips of adjacent CNTs 11' that are too close to each other may cause shielding of the applied electric field. If shielding exists, extra potential needs to be applied in order to overcoming the shielding. This goes against the demand for operation of field emission arrays at low voltages. In addition, such a CNT field emission array is complicated and difficult to produce and assemble. Furthermore, during production and assembly, impurities may become trapped in the CNT field emission array. This may shorten the useful operating lifetime of the CNT field emission array.

SUMMARY OF THE INVENTION

A CNT electron emitter source is provided according to the present invention. The electron emitter source includes a dielectric glass substrate, a plurality of cathode connectors, a plurality of metal wires, a plurality of CNT electron emitters provided on surfaces of the metal wires, and a plurality of dielectric barriers. The cathode connectors are distributed along two opposite sides of the dielectric glass substrate. Each of the metal wires has two terminals secured on a pair of corresponding opposite cathode connectors. Each of the metal wires has a substantially protrusive surface, and at least some of the electron emitters discretely extend from the protrusive surface into a space surrounding the metal wire. The dielectric barriers are distributed on the dielectric glass substrate alternately between the metal wires.

A CNT field emission device is also provided according to the present invention. The CNT field emission device includes an electron emitter source, a gate electrode plate and an anode plate. The gate electrode plate is disposed between the electron emitter device and the anode plate. The electron emitter source includes a dielectric glass substrate, a plurality of cathode connectors, a plurality of metal wires, a plurality of CNT electron emitters provided on surfaces of the metal wires, and a plurality of dielectric barriers. The cathode connectors are distributed along two opposite sides of the dielectric glass substrate. Each of the metal wires has two terminals secured on a pair of corresponding opposite cathode connectors. Each of the metal wires has a substantially protrusive surface, and at least some of the electron emitters discretely extend from the protrusive surface into a space surrounding the metal wire. The dielectric barriers are distributed on the dielectric glass substrate alternately between the metal wires.

An advantage of the electron emitter source is that the CNT electron emitters are less shielded when emitting electrons in that the CNT tips are distributed relatively far away from each other.

Another advantage is that the electron emitter source is simple in structure and easy to be produced and assembled, thus reducing possibility of impurities to be involved in.

A further advantage is that the electron emitter source can emit electrons at a relatively lower voltage.

A still further advantage is that depositing CNTs on metal wires are easier and cheaper than on large size planar surface.

A yet further advantage is that the field emission device driven with a lower voltage have a longer operation lifetime.

BRIEF DESCRIPTION OF THE DRAWINGS

The above-mentioned and other features and advantages, and the manner of attaining them, will become more apparent and the invention will be better understood by reference to the following description of embodiments taken in conjunction with the accompanying drawings, wherein.

Figure 1:
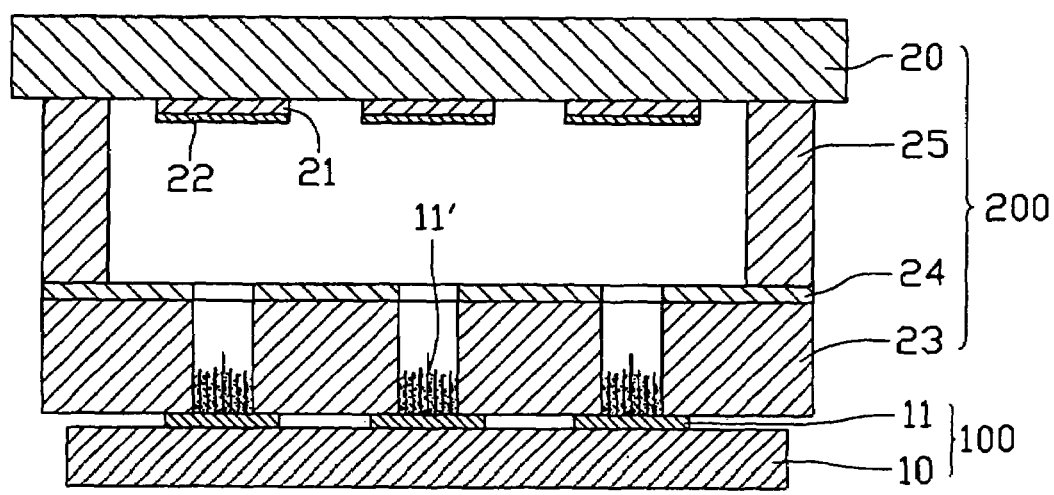
FIG. 1 is a simplified, cross-sectional view of a prior art field emission array with CNTs.

Corresponding reference characters indicate corresponding parts throughout the several views. The exemplifications set out herein illustrate at least two preferred embodiments of the invention, in at least two forms, and such exemplifications are not to be construed as limiting the scope of the invention in any manner.

DETAILED DESCRIPTION OF THE INVENTION

Reference will now be made to the drawings to describe a preferred embodiment of the present invention in detail.

Figure 2:
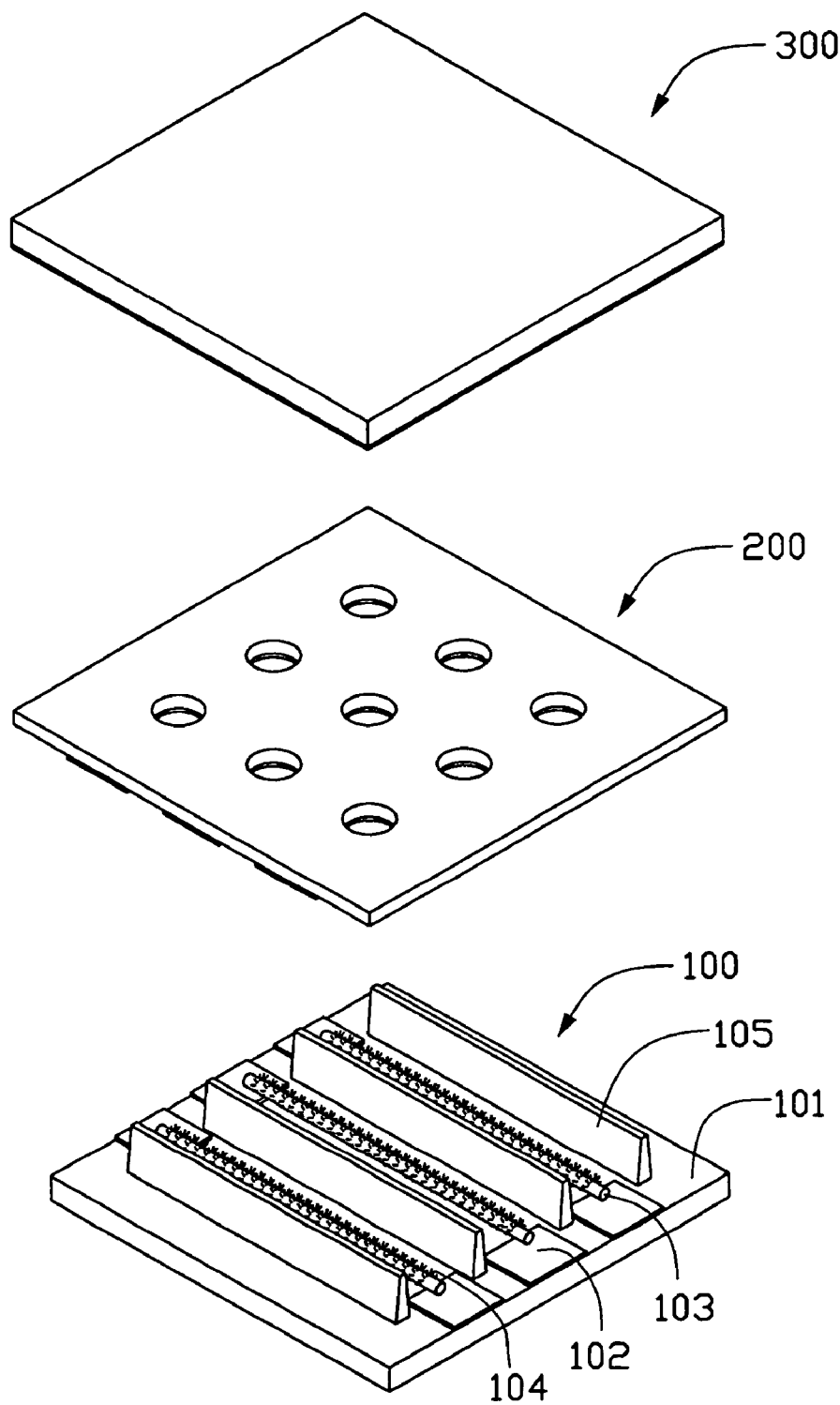
FIG. 2 is a simplified, exploded, isometric view of a field emission device having a CNT electron emitter source according to an exemplary embodiment of the present invention.

Referring now to the drawings, and more particularly to FIG. 2, a field emission device includes a CNT electron emitter source 100, a plate-like gate electrode member 200, and a plate-like anode electrode member 300. The gate electrode plate 200 is substantially disposed over the electron emitter source 100, and the anode electrode plate 300 is substantially disposed over the gate electrode plate 200. The electron emitter source 100 includes a dielectric glass substrate 101, a plurality of cathode connectors 102, a plurality of metal wires 103, a plurality of electron emitters 104, and a plurality of dielectric barriers 105. The cathode connectors 102 are distributed along two opposite sides of the dielectric glass substrate 101. The metal wires 103 are arranged parallel to each other. Each metal wire 103 spans between the opposite sides of the dielectric glass substrate 101. The metal wire 103 has two terminals soldered and secured on a corresponding pair of opposite cathode connectors 102. The electron emitters 104 are secured on surfaces of the metal wires 103. Each of the metal wires 103 has a substantially protrusive surface, which preferably defines a round shape in cross-sectional view. An area of the protrusive surface is larger than a surface area defined by a projection of the metal wire 103 on the dielectric glass substrate 101. The electron emitters 104 are generally discretely secured on the surface of the metal wire 103, and extend generally radially outward from the surface into a space surrounding the metal wire 103. The dielectric barriers 105 are distributed on the dielectric glass substrate 101 alternately between the metal wires 103. The dielectric barriers 105 are for supporting the gate electrode plate 200, and for electrically insulating the gate electrode plate 200 from the CNT electron emitter source 100.

According to the embodiment, the electron emitters 104 are preferably CNTs. The CNTs can be either single wall CNTs or multi-wall CNTs. The metal wires 103 are preferably made of gold or nickel. In the illustrated embodiment, each of the metal wires 103 has a round cross-section. A diameter of the metal wire 103 is in the range from 10 to 200 micrometers, and preferably 50 micrometers. Because the CNTs generally project radially into the space surrounding the metal wire 103, generally speaking, a distance between tips of adjacent CNTs is greater than a distance between base portions of the adjacent CNTs. The CNT electron emitters 104 can be deposited on the metal wires 103 using a chemical vapor deposition (CVD) method, an arc discharging method, or an electrophoretic method.

In order to further secure the metal wires 103 on the dielectric glass substrate 101, a thin layer of ground glass powder may be distributed under the metal wires 103 prior to soldering. When the two terminals of each metal wire 103 are soldered, the ground glass power is also melted to some degree, thus adhering the metal wires 103 onto the dielectric glass substrate 101.

Figure 3:
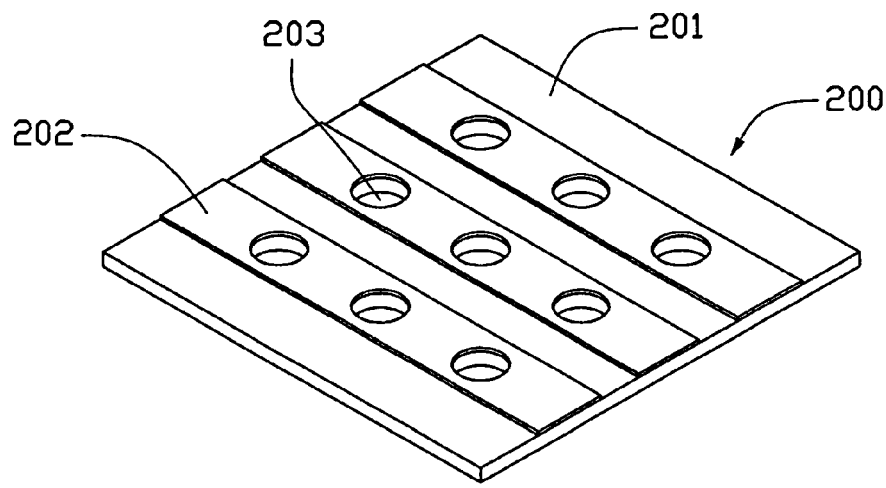
FIG. 3 is an inverted view of a gate electrode plate of the CNT electron emitter source of FIG. 2.

Referring to FIG. 3, according to the embodiment, the gate electrode plate 200 includes a substrate 201, and a plurality of gate electrodes 202 distributed on the substrate 201. The gate electrodes 202 are formed as strips of metal film. The substrate 201 and the gate electrodes 202 commonly define a plurality of through holes 203. The through holes 203 are arranged in a regular array.

Figure 4:
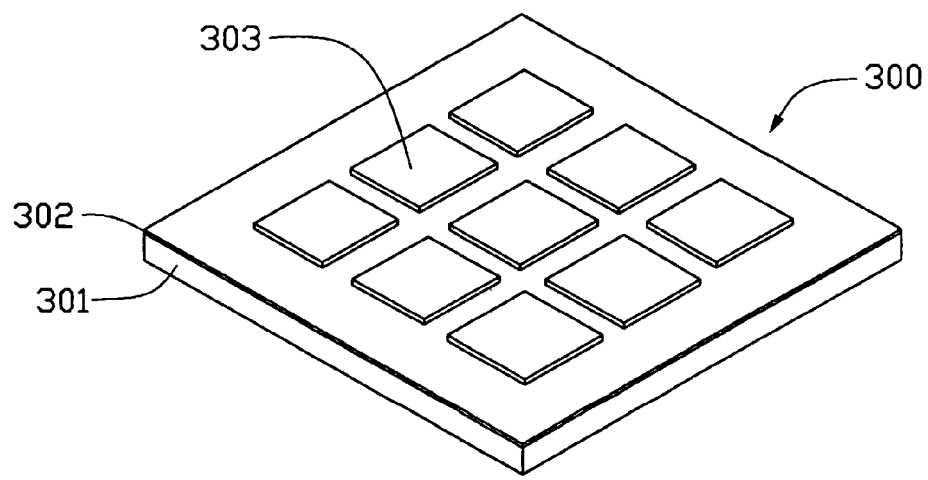
FIG. 4 is an inverted view of an anode electrode plate of the CNT electron emitter source of FIG. 2.

Referring to FIG. 4, an anode electrode plate 300 according to the embodiment includes a panel 301, an anode electrode 302, and a plurality of fluorescent array units 303. Each of the fluorescent array units 303 is opposite to a corresponding through hole 203.

Figure 5:
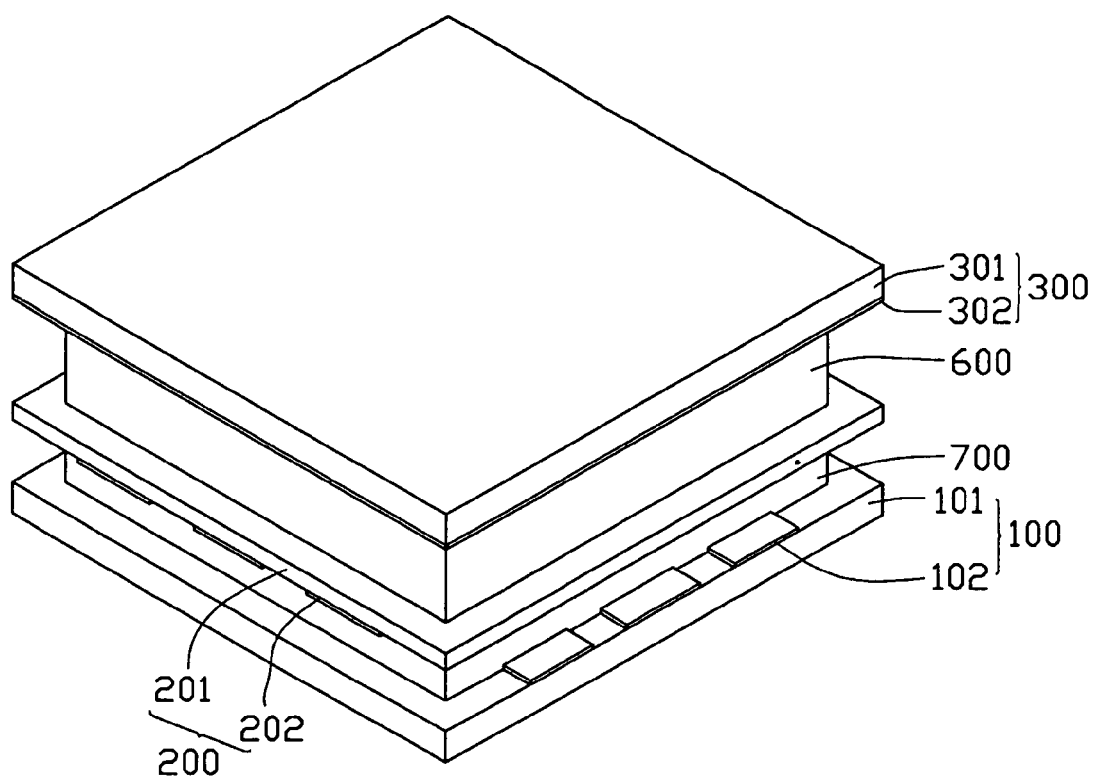
FIG. 5 is a simplified, isometric view of a field emission device having a CNT electron emitter source according to an exemplary embodiment of the present invention.

In assembly, referring to FIG. 5, the gate electrode plate 200 is stacked on the CNT electron emitter source 100, and then the anode electrode plate 300 is stacked on the gate electrode plate 200. The gate electrodes 202 of the gate electrode plate 200 face the electrode emitter source 100, and the fluorescent array units 303 of the anode electrode plate 300 face the gate electrode plate 200. A peripheral first sidewall 600 and a peripheral second sidewall 700 are employed for enclosing, supporting and sealing the CNT electron emitter source 100, gate electrode plate 200 and anode electrode plate 300, thus defining an internal space therein. The internal space is then vacuumized to thereby form a field emission device.

In operation, different potentials are applied to the metal wires 103, the gate electrodes 202, and the anode electrode 302 respectively. The metal wires 103 function as a plurality of cathodes. Under application of the cathode electric field, the electron emitters 104 emit a flow of electrons. The gate electrode electric field focuses the flow of electrons so that the electrons transmit through the through holes 203. Thereafter, the anode electrode electric field accelerates the flow of electrons so that the electrons bombard the fluorescent array units 303.

It is to be noted that those skilled in the art may further adopt a plurality of potential controlling electrodes for further controlling and/or focusing the flow of electrons, as required according to particular need.

Finally, it is to be understood that the invention may be embodied in other forms without departing from the spirit thereof. Thus, the present examples and embodiments are to be considered in all respects as illustrative and not restrictive, and the invention is not to be limited to the details given herein.

We claim:

1. A field emission device comprising:
   a dielectric substrate of said field emission device;
   a plurality of cathode connectors, said cathode connectors being distributed along two opposite sides of said dielectric substrate;
   an anode electrode member spaced from said dielectric substrate in said field emission device and electrifiable to emit light after accepting electrons;
   a gate electrode member disposed between said dielectric substrate and said anode electrode member and spaced from said dielectric substrate and said anode electrode member respectively, said gate electrode member being electrifiable to trigger emission of said electrons toward said anode electrode member; and
   a plurality of electrical conductive wires disposed on said dielectric substrate facing said gate electrode member and said anode electrode member, each of said plurality of wires spaced from one another and said gate electrode member, and having a plurality of electron emitters formed thereon and extending toward said gate electrode member and said anode electrode member, said each of said plurality of wires and said plurality of electron emitters being electrifiable to perform said emission of said electrons toward said anode electrode member with help of said electrifiable gate electrode member, wherein each of said electrical conductive wires has two terminals secured on a pair of corresponding opposite cathode connectors.

2. The field emission device as described in claim 1, wherein said each of said plurality of wires is made from metals comprising gold and nickel.

3. The field emission device as described in claim 1, wherein said each of said plurality of wires has a round cross-section.

4. The field emission device as described in claim 3, wherein said each of said plurality of wires has a diameter in the range from 10 to 200 micrometers.

5. The field emission device as described in claim 1, wherein a distance between tips of adjacent ones of said plurality of electron emitters is greater than a distance between base portions of said adjacent ones of said plurality of electron emitters.

6. The field emission device as described in claim 1, wherein said gate electrode member comprises a substrate and a plurality of gate electrodes distributed on said substrate.

7. The field emission device as described in claim 6, wherein said plurality of gate electrodes of said gate electrode member is formed as strips of metal films.

8. The field emission device as described in claim 6, wherein said substrate and said plurality of gate electrodes of said gate electrode member commonly define a plurality of through holes which are arranged in an array.

9. The field emission device as described in claim 8, wherein said anode electrode member comprises an anode electrode and a plurality of fluorescent array units formed thereon.

10. The field emission device as described in claim 9, wherein each of said plurality of fluorescent array units is aligned with a corresponding through hole.

11. The field emission device as described in claim 1, wherein said plurality of electron emitters is made from carbon nanotubes (CNTs).

* * * * *